2,994,722
PREPARATION OF PHENOLS
John B. Braunwarth, Crystal Lake, and Wade T. Winstead, McHenry, Ill., assignors to The Pure Oil Company, Chicago, Ill., a corporation of Ohio
No Drawing. Filed Nov. 3, 1958, Ser. No. 771,191
10 Claims. (Cl. 260—621)

This invention relates to a method of preparing phenols and alkyl-substituted phenols, i.e., cresols, from aromatic hydrocarbons having at least one unsubstituted nuclear hydrogen atom by direct oxidation with oxygen or air in the presence of metallic copper. In one embodiment of the invention it has been found that the copper oxide produced during the reaction can be readily reduced to metallic copper and recycled with unreacted aromatic hydrocarbon to the reaction zone. In another embodiment of the invention it has been found that the yield of phenolic compounds can be significantly increased by including a small, catalytic amount of a copper salt in the reaction mixture. It will also be shown that the use of a high-surface-area carrier, such as alumina, to support the metallic copper results in increased yields.

The preparation of phenols and cresols by oxidation of the benzene or toluene with copper sulfate and water is known. Starting with benzene the best yield of phenol that is reported by this reaction is 25 mol percent. The best prior art yield of cresol, starting with toluene and using water and copper sulfate, is about 12 mol percent, based on toluene converted (about 8.7 mol percent based on copper sulfate). The reaction takes place with water at temperatures above about 350° F. at superatmospheric pressures, and can be represented by the equation:
$CuSO_4 + ArH + H_2O \rightarrow Cu + ArOH + H_2SO_4$. It has been found in accordance with this invention that a reaction between free oxygen and an aromatic hydrocarbon, in the presence of metallic copper, gives increased yields of phenol or cresols. A further feature of the invention is the discovery that a porous carrier for the metallic copper is particularly effective.

Accordingly, it is an object of the invention to provide a process for producing phenols and alkyl-substituted derivatives thereof by direct oxidation of aromatic hydrocarbons having at least one unsubstituted hydrogen atom per molecule with oxygen or air in the presence of copper and water.

It is another object of the invention to provide a process for producing phenols and alkyl-substituted derivatives thereof by direct oxidation of aromatic hydrocarbons having at least one unsubstituted hydrogen atom per molecule with free oxygen, or gas containing free oxygen, in the presence of copper and water.

A further object of the invention is to provide a process for producing phenols and alkyl-substituted derivatives thereof by direct oxidation of aromatic hydrocarbons having at least one unsubstituted hydrogen atom per molecule with oxygen in the presence of copper and water at temperatures above about 350° F.

Another object of the invention is to provide a process for producing phenols and alkyl-substituted derivatives thereof by direct oxidation of aromatic hydrocarbons having at least one unsubstituted hydrogen atom per molecule with oxygen in the presence of alumina-copper compositions and water at temperatures above about 350° F.

Another object of this invention is to provide a process for producing phenols and alkyl-substituted derivatives thereof by direct oxidation of benzene or toluene with oxygen in the presence of copper and water at temperatures above about 350° F.

And a further object of this invention is to provide a process for producing phenols and cresols by direct oxidation of benzene or toluene with oxygen in the presence of copper, a small, catalytic amount of copper sulfate, and water.

These and further objects of the invention will be described or become apparent as the specification proceeds.

In order to demonstrate the invention, seven experiments were conducted as indicated in the following table. These experiments were conducted as follows:

A 115-cc. autoclave was charged with the selected aromatic hydrocarbon, water, and the other materials listed under each run. Then the autoclave was sealed, flushed thoroughly, and pressured to about 75 p.s.i.g. with oxygen gas. Thereafter, the autoclave was heated to about 615° F., at which temperature it was maintained for two hours, while the reaction mixture was agitated by rocking. Operating pressures reached 1000–1500 p.s.i.g. during heating.

At the end of the two-hour reaction period, the reaction mixture was cooled to room temperature and the final pressure was recorded. Then the reaction mixture was removed from the autoclave, insoluble material was removed by filtering, and the aqueous and hydrocarbon phases were separated by decantation. Both liquid phases were analyzed for phenol content by treatment with excess iodine solution in mild alkaline medium and back-titration with sodium thiosulfate in mild acid medium. From the initial and final pressures, the amount of oxygen (limiting reactant) consumed was calculated, and from this value and the determined amount of phenol in the product, the yield of phenol (based on oxygen consumption) was calculated.

TABLE

| Run | I | II | III | IV | V | VI | VII |
|---|---|---|---|---|---|---|---|
| Charge: | | | | | | | |
| Toluene, cc | 27.0 | 27.0 | 27.0 | 27.0 | | 27.0 | 27.0 |
| Benzene, cc | | | | | 27.0 | | |
| Water, cc | 23.5 | 23.5 | 23.5 | 23.5 | 23.5 | 23.5 | 23.5 |
| Copper, g | 3.2 | 3.2 | | | | | |
| 6% Cu, 17% Mo on— | | | | | | | |
| alumina (g.) | | | 23.4 | 23.4 | 23.4 | | 23.4 |
| CuSO₄ (g.) | | 0.1 | 0.1 | 0.1 | 0.1 | | 0.1 |
| Initial O₂ pressure (p.s.i.g.) | 74 | 75 | 76 | 80 | 76 | 74 | 75 |
| Final O₂ pressure (p.s.i.g.) | 47 | 42 | 42 | 35 | 41 | | |
| Mole O₂ pressure drop | 0.0048 | 0.0058 | 0.0047 | 0.0062 | 0.0048 | | |
| Product: | | | | | | | |
| Moles of cresol | 0.00014 | 0.00044 | 0.00039 | 0.00058 | | 0.0000 | 0.00023 |
| Moles of phenol | | | | | 0.00055 | | |
| Cresol Selectivity (mole percent)[1] | 2.9 | 7.6 | 8.3 | 9.4 | | | |
| Phenol Selectivity (mole percent)[1] | | | | | 11.5 | | |

[1] Based on oxygen, the limiting reactant.

Detailed description of Examples VI and VII follow:

*Example VI*

Following the procedure outlined previously, 23.5 cc. of distilled water and 27 cc. of toluene were charged to a 115-cc. autoclave. The autoclave was flushed thoroughly and pressured to 74 p.s.i.g. with oxygen gas. The autoclave was heated to 600° F., at which temperature it was maintained for 2 hours and 25 minutes while the reaction mixture was agitated by rocking. After the reaction period, the reactor was cooled and the reaction mixture removed and analyzed for cresols. Yield of cresol was negligible.

*Example VII*

Again following the procedure outlined previously, 23.5 cc. of distilled water, 27 cc. of toluene, 0.1 gm. $CuSO_4 \cdot 5H_2O$, and 23.4 g. of used material consisting of 6% copper and 17% molybdenum supported on alumina, which had been recovered from runs III and IV, were charged to a 115-cc. autoclave. The autoclave was flushed thoroughly and pressured to 75 p.s.i.g. with oxygen gas. Thereafter, the autoclave was heated to 630° F., at which temperature it was maintained for two hours while the reaction mixture was agitated by rocking. After the two-hour reaction period, the reactor was cooled, and the reaction mixture removed and analyzed for cresol. Yield of cresol was 0.0023 mole or only 49% of that obtained from run III using the same copper-containing material except that it was fresh after being activated by reduction with hydrogen.

Referring to run I in the table, a cresol yield of 2.9 mol percent, based on oxygen consumption, was obtained when toluene was oxidized according to our invention. In run II a small, catalytic amount of copper sulfate was added to a reaction mixture otherwise identical to that of run I, and the cresol yield was increased by 160%. In run III, the yield was increased still further (10%) by using copper and molybdenum supported on alumina to increase the available metal surface and improve mixing. Increasing the oxygen pressure apparently increases the yield, as indicated by comparing runs IV and V. However, this could also result in the promotion of undesirable side reactions, in which case operating at lower yield, with recycle, would be preferable.

The copper compounds used, exemplified by copper sulfate, may be of the cuprous or cupric variety although the latter are preferred. In general, the reaction may be carried out using water-soluble copper salts which function in the manner of copper sulfate. The copper compounds may be illustrated by copper sulfate (anhydrous), copper sulfate pentahydrate, copper phosphate, copper chloride, copper acetate and the like.

The amounts of metallic copper used may vary from about 0.05 to 10 mols per mol of aromatic compound to be reacted. The amount of copper compound used may vary from about 0.05 to 0.2 mol percent, based on the amount of aromatic feed used, or even less.

The amount of copper compound is substantially less than the amount of metallic copper. In general, between about 20 to 100 mols of metallic copper is used per mol of copper compound for best results. The preferred ratio of copper compound to copper is about 1 to 55, but this is not critical since the copper compound is functioning simply as a catalyst.

The reaction is carried out either batchwise or continuously. In batchwise operation the oxidation is maintained under conditions of pressure and temperature such that part of the water is maintained in a liquid phase, although the phase relationship of the reactants does not appear to influence the reaction. In continuous operation, the aromatic hydrocarbon, oxygen (or air), and water are passed in vapor phase through a fixed bed of the supported copper admixed with the copper compound.

The temperature must be maintained above about 350° F. for the reaction. A preferred reaction temperature is between about 350° to 710° F., and 500 to 675° F. gives the best results. Side reactions are promoted by the use of higher temperatures than 710° F. Recycling increases the ultimate yields considerably in the instant process.

The aromatic hydrocarbons used as feed to the process include benzene, naphthalene and alkyl-substituted derivatives thereof having at least one unsubstituted nuclear hydrogen atom. The alkyl group attached to the aromatic nucleus may contain from 1 to 18 carbon atoms and the alkyl groups may be straight-chain, branched-chain, or alicyclic. Examples of feed hydrocarbons include benzene, toluene, ortho-xylene, meta-xylene, para-xylene, ethylbenzene, the trimethylbenzenes, propylbenzene, cymene, durene, isodurene, mellitene, and prehnitene, phenylbenzene, diphenylene, p-diphenylbenzene, diphenylmethane, 1,1-diphenylmethane, dibenzyl, triphenylmethane, indene, naphthalene, 1,2,5-trimethylnaphthalene, anthracene, and phenanthren.

The process may be conducted by recovery of the copper oxide formed during the reaction, and its reduction to metallic copper for re-use. Although the invention has been illustrated by way of certain examples, the only limitations attaching thereto appear in the appended claims.

What is claimed is:

1. A process for producing phenols which comprises reacting an aromatic hydrocarbon having at least one unsubstituted nuclear hydrogen atom with water, metallic copper, and an inert gas containing free oxygen, at a temperature of about 350° to 710° F. under superatmospheric pressures.

2. The process in accordance with claim 1 in which the aromatic hydrocarbon is selected from the group of benzene, naphthalene, and anthracene, and alkyl derivatives thereof wherein the alkyl radicals contain from 1 to 18 carbon atoms.

3. The process in accordance with claim 2 in which the alkyl groups are straight-chain.

4. The process in accordance with claim 1 in which the reaction is carried out in the presence of a small amount of a copper salt.

5. The process in accordance with claim 4 in which the copper salt is selected from the group of copper sulfate, copper sulfate pentahydrate, copper chloride and copper acetate.

6. The process in accordance with claim 5 in which the amount of said copper salt is less than the amount of said metallic copper.

7. The process for producing phenol which comprises heating benzene with oxygen and metallic copper in the presence of water at a temperature of about 350° F. to 710° F. and under sufficient pressure to maintain a part of the water in the liquid phase.

8. The process in accordance with claim 7 in which said metallic copper is carried on a support consisting of 17% by weight of molybdenum on alumina, said copper being present in an amount of about 6% by weight based on said support.

9. The process of producing cresols which comprises heating toluene with oxygen, a copper salt, and metallic copper in the presence of water at a temperature of about 350° F. to 710° F. and under sufficient pressure to maintain a part of said water in the liquid phase, said copper salt being present in an amount less than the amount of said metallic copper.

10. The process in accordance with claim 9 in which said metallic copper is carried on a support consisting of 17% by weight of molybdenum on alumina, said metallic copper being present in an amount of about 6% by weight based on said support.

References Cited in the file of this patent

UNITED STATES PATENTS

| | | |
|---|---|---|
| 2,760,991 | Toland | Aug. 28, 1956 |
| 2,847,475 | Voge et al. | Aug. 12, 1958 |
| 2,852,567 | Barnard et al. | Sept. 16, 1958 |